United States Patent [19]

O'Connor et al.

[11] 4,439,576

[45] Mar. 27, 1984

[54] MODIFIED POLYURETHANE LIQUID POLYMER COMPOSITIONS

[75] Inventors: James M. O'Connor, Clinton; Donald L. Lickei, Wallingford; Michael L. Rosin, Madison, all of Conn.

[73] Assignee: Olin Corporation, New Haven, Conn.

[21] Appl. No.: 306,848

[22] Filed: Sep. 29, 1981

Related U.S. Application Data

[63] Continuation-in-part of Ser. No. 203,212, Nov. 3, 1980, and a continuation-in-part of Ser. No. 203,213, Nov. 3, 1980, abandoned.

[51] Int. Cl.³ .............................................. C08K 3/26
[52] U.S. Cl. .................................... 524/425; 524/430; 524/445; 524/451; 524/452; 524/492; 524/495; 524/874; 524/875; 525/920; 528/75; 528/76

[58] Field of Search ............... 524/874, 875, 425, 445, 524/451, 492, 495, 452, 430; 528/75, 76; 525/920

[56] References Cited

U.S. PATENT DOCUMENTS

| | | | |
|---|---|---|---|
| 3,368,988 | 2/1968 | Sekmakas | 524/589 |
| 4,062,826 | 12/1977 | Hutchinson et al. | 524/521 |
| 4,250,077 | 2/1981 | Bonin et al. | 524/875 |
| 4,309,526 | 1/1982 | Baccei | 528/75 |

*Primary Examiner*—J. Ziegler
*Attorney, Agent, or Firm*—William D. Sabo

[57] ABSTRACT

A novel, heat curable, liquid polymer composition is disclosed which comprises a modified polyurethane oligomer containing terminal ethylenic unsaturation, a free radical generating catalyst, and at least one additional component selected from a reinforcing agent and a filler. The cured composition demonstrates desirable impact properties and is particularly useful in automotive body constructions.

17 Claims, No Drawings

MODIFIED POLYURETHANE LIQUID POLYMER COMPOSITIONS

This application is a continuation-in-part of copending application Ser. No. 203,212, filed Nov. 3, 1980, and of copending application Ser. No. 203,313, abandoned, which was also filed Nov. 3, 1980.

In recent years, there has been a steady increase in the use of reinforced plastic materials for exterior components in automotive construction. Further increases in the utilization of plastics can be expected as automobile manufacturers continue to strive to meet vehicle weight reduction goals.

In the area of rigid plastic automotive components, fiberglass reinforced thermosetting polyester resins have been extensively employed. This can be attributed to their overall physical capabilities (e.g., dimensional stability, strength, high temperature resistance and paint adhesion). Other advantages include facility of handling and machining. However, these polyester systems still present certain deficiencies such as a brittle nature, which can lead to severe impact and fatigue problems. There is also a need to improve surface characteristics and shrinkage control.

To overcome these problems, various additives have been introduced into polyester sheet molding compounds (SMC) and bulk molding compounds (BMC). For example, in U.S. Pat. No. 4,020,036 issued to Aubrey South, Jr. on Apr. 26, 1977, liquid polymers, such as polybutadiene, are added in order to toughen polyester products. However, since these materials are not inherently compatible with polyester, these additives cannot be added to the polyester until it is time to mix the resin with the fiberglass. Saturated diacids or long-chain glycols also have been used in preparing polyester resins; the resulting products have been flexibilized, but, at the cost of lower mechanical and thermal properties.

Another approach involves the introduction of polyurethane systems into polyester resins. In U.S. Pat. No. 4,062,826 issued to Francis Gowland Hutchinson et al. on Dec. 13, 1977, precursors of a cross-linked polyurethane are polymerized within a mixture of ethylenically unsaturated polyester and vinyl monomer to form a product with an interpenetrating polyurethane gel network within the polyester cross-linked structure. While higher impact properties are reported to be achieved, the fine surface finish required for automotive body part applications is not accomplished. See Forger, G., *Toughened SMC,* Plastics World, page 63 (June 1978).

Now, according to the invention, it has been discovered that these requirements can be achieved by employing a select polyurethane system which includes a select polyurethane oligomer, a free radical generating catalyst and at least one additional component selected from a reinforcing agent and a filler. In the practice of the invention, a molded plastic product is produced which features desirable impact properties and is suitable for many of the same utilities as thermoset polyester resin compositions such as parts for automotive body applications.

The polyurethane oligomer that is utilized according to the invention is prepared by reacting an organic polyisocyanate, a polyol and an isocyanate reactive group-containing unsaturated monomer. The reaction is carried out using methods well known in the art and employing such relative proportions of the reactants so as to achieve an oligomer product having an equivalent ratio of NCO to OH from about 0.8/1 to about 2/1, and preferably from about 1/1 to about 1.2/1. In forming the oligomer, there is also employed an equivalent ratio of isocyanate reactive group-containing unsaturated monomer to polyol in the range from about 0.6/1 to about 25/1, and preferably from about 0.8/1 to about 10/1. By reaction of the organic polyisocyanate, polyol and isocyanate reactive group-containing unsaturated monomer, a controlled molecular weight polyurethane oligomer with terminal reactive unsaturation is produced.

Preferably, the reaction is accelerated by employing a catalyst; common urethane catalysts, e.g., tertiary amines and metal compounds such as stannous octoate or dibutyltin dilaurate may be used. Any catalytic amount may be employed; illustratively, such amount varies, depending on the particular catalyst utilized, from about 0.01 to about 1 percent by weight of the polyurethane oligomer. It is also preferred to carry out the reaction in the presence of a reactive copolymerizable solvent. Suitable copolymerizable solvents include vinylidene compounds such as styrene, vinyl toluene, methacrylic esters, acrylic esters, divinyl benzene, and the like, familiar to those skilled in the art. The amount of copolymerizable solvent employed may be varied over a wide range. Generally, however, the copolymerizable solvent is employed in an amount of from about 0 to about 100 parts by weight per 100 parts by weight of the polyurethane oligomer of the present invention.

Any suitable organic polyisocyanate, or mixture of polyisocyanates, may be employed in preparing the polyurethane oligomer. Illustrative are toluene diisocyanate, such as the 80:20 and the 65:35 mixtures of the 2,4- and 2,6-isomers, ethylene diisocyanate, propylene diisocyanate, methylene-bis (4-phenyl) isocyanate, xylene diisocyanate, 3,3'-bitoluene-4,4'-diisocyanate, hexamethylene diisocyanate, naphthalene-1,5-diisocyanate, the polymeric isocyanates such as polyphenylene polymethylene isocyanate, mixtures thereof, and the like. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20.

The polyol reactant used in the polyurethane oligomer formation is selected from polyether polyols and mixtures of two or more such compounds. The polyol, or mixture of polyols, should have an average equivalent weight ranging from about 75 to about 500. Preferably, the average equivalent weight is about 100 to about 200. The average functionality of the polyol or polyol blend is at least about 3, preferably about 3 to 8, and most preferably about 4 to about 6.

Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or a mixture of polyhydric initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether polyol reactant includes the following and mixtures thereof: (a) the aliphatic triols such as glycerol, trimethylolpropane, triethylolpropane, trimethylolhexane, and the like; (b) higher functionality hydroxy compounds such as sucrose, dextrose, sorbitol, pentaerythritol, methyl glucoside, and the like; (c) the polyamines such as tetraethylene diamine; and (d) the alkanolamines such as diethanolamine, triethanolamine, and the like.

A preferred group of polyhydric initiators for use in preparing the polyether polyol reactant is one which comprises mixtures of sucrose, dextrose or methyl glucoside with an aliphatic triol, preferably glycerol.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having an average equivalent weight of about 75 to about 500, preferably about 100 to about 200. The catalyst is thereafter preferably removed, leaving a polyether polyol which is ready for use in preparing the polyurethane oligomer of the invention.

Suitable isocyanate reactive group-containing unsaturated monomers include hydroxyl group-containing or amino group-containing acrylates and acrylamides such as hydroxyethyl acrylate, hydroxypropyl acrylate, hydroxyethyl methacrylate, hydroxyethyl acrylamide, hydroxypropyl acrylamide, and the like, and mixtures thereof. Acrylates are preferred, with hydroxyethyl acrylate, hydroxypropyl acrylate, and hydroxyethyl methacrylate being the most preferred.

In forming the polyurethane oligomer, it is also preferred to include chain extenders, well known to those in the polyurethane art, in the reaction mixture. These chain extenders include low molecular weight glycols such as ethylene glycol, butane diol, hexane diol, propylene glycol, tripropylene glycol, bisphenol A, and the like. Other suitable chain extenders are polyether polyols, or mixtures of polyether polyols, having an average equivalent weight ranging from about 200 to about 4,000 and an average functionality of about 2. The amount of chain extender employed can vary broadly depending upon the amount of polyol reactant used in preparing the polyurethane oligomer.

The modified polyurethane oligomer liquid polymer system is polymerized and cured in the presence of a heat activated, free radical generating catalyst. The actual curing conditions may vary over wide ranges and are generally dependent on the nature and amount of the particular catalyst employed. Suitable free radical generating catalysts include peroxide or azo type compounds, known to those in the art. Typical peroxide catalysts are illustrated by organo peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, and the like. Typical azo compounds are azobis-isobutyronitrile, 2-t-butylazo-2-cyano-4-methylpentane, and 4-t-butylazo-4-cyano-valeric acid. The preferred catalysts are peroxide catalysts. In particular, preferred peroxide catalysts are t-butyl peroctoate, t-butyl perbenzoate, and mixtures thereof. Any suitable catalytic amount may be employed; however, the catalyst generally is used in an amount from about 0.1 to about 10 parts by weight per 100 parts by weight of the polyurethane oligomer.

The composition of the present invention also contains at least one of a filler or a reinforcement material. In particularly preferred embodiments of the invention, both filler and reinforcement material are included in the formulation. Any material known to those in the art as being suitable as a filler may be employed. Generally, a variety of materials, e.g., finely divided solids including $CaCO_3$, clay, alumina, talc, glass microspheres, and the like, may be utilized. Also, any suitable reinforcement material may be used, such as chopped fiberglass, carbon fibers, asbestos fibers, boron nitride whiskers, and the like. The amount of filler generally included in the formulation may vary considerably, but usually ranges from about 20 to about 400 parts, and preferably from about 100 to about 220 parts, per 100 parts by weight of the polyurethane oligomer. When a reinforcing agent is added to the formulation, the amount may also vary over a wide range; however, a typical formulation will generally contain from about 10 to about 150 parts, and preferably from about 60 to about 130 parts, per 100 parts by weight of the polyurethane oligomer.

The composition also may include other standard ingredients, if desired, such as internal mold release agents, e.g., calcium, zinc, magnesium, or sodium stearate. Low shrink or impact additives also may be included, if desired. Pigments, dyes, stabilizers, viscosity modifiers (e.g., Group II metal oxides and hydroxides, such as magnesium oxide) and various other additives familiar to those skilled in thermosetting polyester technology also may be added.

By way of illustration, all the ingredients of the composition, except filler and/or reinforcing material, are mixed, usually in a high shear mixing device. The filler, if employed, is then added gradually to the mixture and mixed until a homogeneous paste is obtained. Reinforcing agent, such as chopped glass, is then added gradually to the paste and the paste is worked so as to achieve good glass wet-out. The resulting uncured mix is then cured under elevated temperature and pressure conditions as is well known to those skilled in the art. Upon cure, a polyurethane polymer product demonstrating desirable impact and strength properties is obtained.

The following examples are provided to further illustrate the invention. All parts are by weight unless otherwise specified.

PREPARATION OF POLYURETHANE OLIGOMER

EXAMPLE 1

To 174 grams (2.0 eq.) of diisocyanate[1], 285 grams of styrene, 0.071 grams of hydroquinone and 0.142 grams of 2,6-di-tertiary-butyl-4-methylphenol (BHT) were added dropwise with stirring a mixture of 117.5 grams (0.8 eq.) of a polyether polyol[2], 19.2 grams (0.2 eq.) of a chain extender[3] and 116 grams (1.0 eq.) of unsaturated monomer[4] over a period of 2 hours. The reaction temperature rose from 21° to 36° C., and the mixture was stirred without heating for 2 hours after completion of the addition. At this point, 2.84 grams of catalyst[5] were added. After stirring without heating for 15 minutes, the reaction mixture was heated to 70° C. and was stirred at 70° C. for 4½ hours. The product had a viscosity of 5200 cps at 25° C.

[1] This is a mixture of toluene diisocyanate isomers (80:20 mixture of 2,4/2,6-isomers).
[2] This is a polyether polyol having a molecular weight of about 650 and an average functionality of about 4.25 and prepared by condensing a sucrose/glycerol mixture with propylene oxide to a final hydroxyl number of about 375.

3. Tripropylene glycol.
4. Hydroxyethyl acrylate.
5. This is a 50% stannous octoate in dioctyl phthalate and is a commercial product of Witco Chemical Corporation purchased under the designation "T-10".

EXAMPLES 2-10

Additional polyurethane oligomers were prepared employing the same conditions as in Example 1, except that the time was varied for the reaction at 70° C. in the final step of the procedure. Different reactants and proportions of reactants were also used. Table I outlines the oligomer compositions prepared according to Examples 2-10.

strength-ASTM D790; tensile strength and elongation-ASTM D3574; and falling dart impact-ASTM D3029.

TABLE II

| POLYURETHANE MOLDING FORMULATION (BMC) | | |
|---|---|---|
| Component | Parts by Weight | |
| Polyurethane Oligomer | 100 | (40% Styrene) |
| Tertiary Butyl Perbenzoate | 1.4 | |
| Tertiary Butyl Peroctoate[1] | 0.5 | |
| Zinc Stearate | 4.3 | |
| Calcium Carbonate | 160 | |
| ⅛ Inch Glass | 99 | |

[1]Commercially available from Lupersol Co. under the designation "PDO", understood to consist of 50% tertiary butyl peroctoate and 50% dioctyl phthalate.

TABLE I

| | | OLIGOMER COMPOSITIONS | | | | | | | |
|---|---|---|---|---|---|---|---|---|---|
| | Diisocyanate[1] | Polyether Polyol (eq.) | | Chain Extender (eq.) | | Unsaturated Monomer (eq.) | | | Viscosity | Reaction Time |
| Example | (eq.) | A[2] | B[3] | C[4] | D[5] | E[6] | F[7] | G[8] | (cps at 25° C.) | at 70° C. (hrs.) |
| 1 | 2.0 | 0.8 | — | 0.2 | — | 1.0 | — | — | 5200 | 4¼ |
| 2 | 2.0 | — | 0.6 | 0.4 | — | — | 1.0 | — | 4000 | 3½ |
| 3 | 2.0 | — | 0.2 | 0.6 | 0.2 | 0.5 | 0.5 | — | 640 | 4 |
| 4 | 2.0 | 0.2 | — | 0.8 | — | — | 1.0 | — | 650 | 10 |
| 5 | 2.0 | 0.6 | — | 0.2 | 0.2 | — | 1.0 | — | 3300 | 5 |
| 6 | 2.0 | 0.8 | — | 0.15 | 0.05 | 0.5 | 0.5 | — | 5350 | 7½ |
| 7 | 2.0 | 0.1 | 0.1 | — | 0.8 | — | 1.0 | — | 350 | 6½ |
| 8 | 2.0 | 0.8 | — | 0.2 | — | — | — | 1.0 | 355 | 5¼ |
| 9 | 2.0 | 0.2 | — | 0.8 | — | — | — | 1.0 | 500 | 7 |
| 10 | 2.0 | — | 0.2 | 0.8 | — | 1.0 | — | — | — | 3½ |

[1]The diisocyanate is a mixture of toluene diisocyanate isomers (80:20 mixture of 2,4/2,6-isomers).
[2]A polyether polyol having a molecular weight of about 650 and an average functionality of about 4.25 and prepared by condensing a sucrose/glycerol mixture with propylene oxide to a final hyroxyl number of about 375.
[3]A polyether polyol having a molecular weight of about 480 and an average functionality of about 4.54 and prepared by condensing a sucrose/glycerol mixture with propylene oxide to a final hydroxyl number of about 530.
[4]Tripropylene glycol.
[5]A polyether polyol having a molecular weight of about 425 and prepared by condensing propylene glycol with propylene oxide to a final hydroxyl number of about 265.
[6]Hydroxyethyl acrylate.
[7]Hydroxypropyl acrylate.
[8]Hydroxyethyl methacrylate.

PREPARATION OF POLYURETHANE MOLDINGS

EXAMPLES 11-16

Test panels were prepared containing polyurethane oligomers prepared according to Examples 2, 4-7 and 10. The molding formulation used is listed in Table II below. The following procedure was followed in the preparation of the cured composites.

(a) Into a high shear mixing device were added to the polyurethane oligomer, styrene, other monomers, catalyst and pigments.
(b) The filler was added gradually and mixed until a homogeneous paste was achieved.
(c) Next chopped fiberglass was added gradually to the paste in a two-roll mill and the mix was worked the minimal length of time to achieve good wet out of the glass without significant breakdown.
(d) The uncured mix was then placed in a mold between the platens of a compression molding machine and cured under pressure (2,000 psi) for three minutes at 300°-325° F.
(e) Alternatively to (d), the mixture may be added by a hopper device to the screw system of an injection molding device to produce an injection molded part, or the mix may be made up on an SMC machine for later compression or injection molding.

The physical properties of panels prepared in this manner are included in Table III below. The physical properties were determined in accordance with standard test procedures: Flexural modulus and flexural

COMPARATIVE EXAMPLE 1

For purposes of comparison, a test panel containing a polyester resin was prepared following the procedure of Examples 11-16. The molding formulation employed was as follows:

| Component | Parts by Weight | |
|---|---|---|
| Polyester Resin[1] | 100 | (36% Styrene) |
| Tertiary Butyl Perbenzoate | 1.4 | |
| Tertiary Butyl Peroctoate[2] | 0.5 | |
| Zinc Stearate | 4.3 | |
| Calcium Carbonate | 160 | |
| ⅛ Inch Glass | 99 | |

[1]A vinyl ester resin commercially available from Dow Chemical Company under the designation "Derakane 470".
[2]Commercially available from Lupersol Co. under the designation "PDO", understood to consist of 50% tertiary butyl peroctoate and 50% diocytl phthalate.

The physical properties of the panel prepared in this manner are included in Table III below. The physical properties were determined in accordance with standard test procedures: Flexural modulus and flexural strength-ASTM D790; tensile strength and elongation-ASTM D3574; and falling dart impact-ASTM D3029.

In comparing the results, the composites prepared from polyurethane oligomers of the invention showed overall properties generally improved over those demonstrated by the composite made from the conventional vinyl ester. These composites exhibited desirable impact properties, and enhanced flexural strength and modulus, the latter characteristics indicating improved strength,

TABLE III
PHYSICAL PROPERTIES OF POLYURETHANE OLIGOMER COMPOSITES

| Example | Polyurethane Oligomer | Tensile Strength (psi) | Flexural Strength (psi) | Flexural Modlus × $10^6$ (psi) | Elongation (%) | Falling Dart Impact (in.-lb.) |
|---|---|---|---|---|---|---|
| 11 | Example 2 | 5500 | 12,700 | 1.10 | 1.63 | 24 |
| 12 | Example 4 | 3950 | 14,600 | 1.28 | 1.26 | 30 |
| 13 | Example 5 | 5500 | 14,100 | 1.18 | 1.46 | 27 |
| 14 | Example 6 | 3950 | 12,300 | 1.18 | 1.37 | 30 |
| 15 | Example 7 | 4750 | 14,600 | 1.22 | 1.33 | 27 |
| 16 | Example 10 | 5230 | 13,800 | 1.11 | 1.47 | 29 |
| CE-1 | — | 4700 | 10,500 | 0.98 | 1.16 | 27 | which is particularly important for automotive body applications.

What is claimed is:

1. A polyurethane liquid polymer composition comprising a polyurethane oligomer, a heat activated free radical generating catalyst and at least one additional component selected from the group consisting of a reinforcing agent and a filler, said polyurethane oligomer having an equivalent ratio of NCO to OH from about 0.8/1 to about 2/1 and being prepared by reacting
   (a) an organic polyisocyanate;
   (b) a polyether polyol having an average equivalent weight of about 75 to about 500 and an average functionality of at least about 3; and
   (c) an isocyanate reactive group-containing unsaturated monomer selected from the group consisting of hydroxyethyl acrylate, hydroxypropyl acrylate, hydroxyethyl methacrylate, hydroxyethyl acrylamide, hydroxypropyl acrylamide, and mixtures thereof;
wherein there is employed an equivalent ratio of said isocyanate reactive group-containing unsaturated monomer to said polyether polyol in the range from about 0.6/1 to about 25/1.

2. The composition of claim 1, including a copolymerizable solvent in said polyurethane liquid polymer composition.

3. The composition of claim 2, wherein said copolymerizable solvent is styrene.

4. The composition of claim 1, wherein said polyurethane oligomer has an equivalent ratio of NCO to OH from about 1/1 to about 1.2/1.

5. The composition of claim 4, wherein said equivalent ratio of said isocyanate reactive group-containing unsaturated monomer to said polyether polyol is in the range from about 0.8/1 to about 10/1.

6. The composition of claim 1, wherein said unsaturated monomer is selected from the group consisting of hydroxyethyl acrylate, hydroxypropyl acrylate, hydroxyethyl methacrylate, and mixtures thereof.

7. The composition of claim 1, wherein said heat activated free radical generating catalyst is a peroxide catalyst.

8. The composition of claim 7, wherein said peroxide catalyst is selected from the group consisting of t-butyl perbenzoate, t-butyl peroctoate, and mixtures thereof.

9. The composition of claim 1, wherein said polyether polyol has an average equivalent weight of about 100 to about 200 and an average functionality of about 4 to about 6 and is prepared by reacting a polyhydric initiator selected from the group consisting of a mixture of sucrose and an aliphatic triol, a mixture of dextrose and an aliphatic triol, and a mixture of a methyl glucoside and an aliphatic triol with an alkylene oxide selected from the group consisting of propylene oxide and mixtures of propylene oxide and ethylene oxide.

10. The composition of claim 1, wherein said polyurethane oligomer further comprises a chain extending agent.

11. The composition of claim 10, wherein said chain extending agent is selected from the group consisting of tripropylene glycol, a polyol having an average equivalent weight ranging from about 200 to about 4,000 and an average functionality of about 2, and mixtures thereof.

12. The composition of claim 1, wherein said polyurethane oligomer is prepared by employing toluene diisocyanate as said organic polyisocyanate.

13. The composition of claim 1, comprising a peroxide catalyst, about 60 to about 130 parts by weight of a reinforcing agent per 100 parts by weight of said polyurethane oligomer, about 100 to about 220 parts by weight of a filler per 100 parts by weight of said polyurethane oligomer, and wherein said polyurethane oligomer has an equivalent ratio of NCO to OH from about 1/1 to about 1.2/1 and is prepared by reacting
   (a) toluene diisocyanate;
   (b) a polyether polyol having an average equivalent weight of about 100 to about 200 and an average functionality of about 4 to about 6 and prepared by reacting a polyhydric initiator selected from the group consisting of a mixture of sucrose and an aliphatic triol, a mixture of dextrose and an aliphatic triol, and a mixture of a methyl glucoside and an aliphatic triol with an alkylene oxide selected from the group consisting of propylene oxide and mixtures of propylene oxide and ethylene oxide; and
   (c) an isocyanate reactive group-containing unsaturated monomer selected from the group consisting of hydroxyethyl acrylate, hydroxypropyl acrylate, hydroxyethyl methacrylate, and mixtures thereof; and
wherein said equivalent ratio of said isocyanate reactive group-containing unsaturated monomer to said polyether polyol is in the range from about 0.8/1 to about 10/1.

14. The composition of claim 13, including a copolymerizable solvent in said polyurethane liquid polymer composition.

15. The composition of claim 14, wherein said copolymerizable solvent is styrene.

16. The composition of claim 15, wherein said polyurethane oligomer further comprises a chain extending agent.

17. The composition of claim 16, wherein said chain extending agent is selected from the group consisting of tripropylene glycol, a polyol having an average equivalent weight ranging from about 200 to about 4,000 and an average functionality of about 2, and mixtures thereof.

* * * * *